(No Model.)

H. M. GOODMAN.
AXLE LUBRICATOR.

No. 487,181. Patented Nov. 29, 1892.

Witnesses
Jesse Heller.
Phill Masi.

Inventor
Henry M. Goodman,
by E. W. Anderson
his Attorney

UNITED STATES PATENT OFFICE.

HENRY M. GOODMAN, OF LOUISVILLE, KENTUCKY.

AXLE-LUBRICATOR.

SPECIFICATION forming part of Letters Patent No. 487,181, dated November 29, 1892.

Application filed April 16, 1892. Serial No. 429,402. (No model.)

*To all whom it may concern:*

Be it known that I, HENRY M. GOODMAN, a citizen of the United States, and a resident of Louisville, in the county of Jefferson and State of Kentucky, have invented certain new and useful Improvements in Self-Oiling Axles; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1:
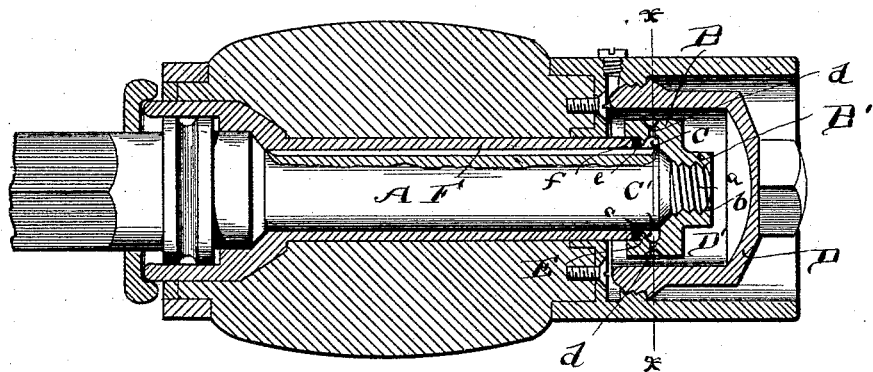
Figures 2, 3:
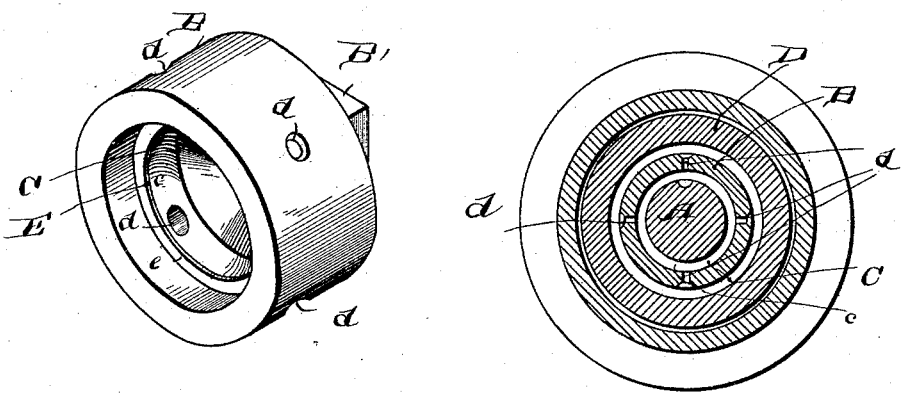

Figure 1 of the drawings is a vertical longitudinal section of hub and axle-lubricator. Fig. 2 is a perspective view of axle-nut. Fig. 3 is a vertical cross-section taken on line $x\ x$, Fig. 3.

This invention has relation to certain new and useful improvements in self-oiling axles; and it consists in the novel construction and combination of parts, as hereinafter specified.

In the accompanying drawings the letter A designates the outer end portion of an axle-arm having at its extremity a reduced cylindric screw-threaded portion $a$.

B designates the axle-nut, which has an extension B', formed with an interior-threaded bore $b$ to receive the portion $a$ of the arm. The inner cylindric portion of the nut is formed with a circular chamber C, into which projects the portion C' of the axle-arm, leaving a surrounding annular space $c$. This nut is inclosed in a cap-section D of the hub, in which is formed an oil or lubricant chamber D', in the manner shown in my former patent, No. 442,521, dated December 9, 1890, said chamber being filled through an aperture communicating therewith and normally closed by a screw-plug. The lubricant from this chamber enters the chamber C through a series of four or more openings or apertures $d$, cut through the cylindric portion B of the nut at the rear of the extension B'. These openings may be either straight or inclined, and the lubricant passing therethrough finds its way along over the projecting extremity of the axle-arm to the inner end through suitable grooves or channels or along the surface. The inner face E of the nut is formed with a circular groove or seat $e$ to receive the end $f$ of the bearing-sleeve F of the hub, at which point a washer $g$ may be provided.

Having described this invention, what I claim as new, and desire to secure by Letters Patent, is—

The combination, with the hub having on its outer end a cap D, formed with an interior oil or lubricant chamber or reservoir D', of the axle-nut B therein, having a threaded engagement with the outer end of the axle, a chamber C in said nut surrounding the outer end of said axle, a series of radial apertures or passages through said nut and connecting said chamber with the reservoir D', and means on said axle whereby the lubricant may flow inwardly thereon, substantially as specified.

In testimony whereof I affix my signature in presence of two witnesses.

H. M. GOODMAN.

Witnesses:
S. O. WALKER,
GEO. C. STAUBEE.